(12) United States Patent
Pena

(10) Patent No.: US 11,129,457 B2
(45) Date of Patent: Sep. 28, 2021

(54) HAIR STYLING IRON WITH A BUILT-IN BLUETOOTH

(71) Applicant: Joe Anthony Pena, Victoria, TX (US)

(72) Inventor: Joe Anthony Pena, Victoria, TX (US)

( * ) Notice: Subject to any disclaimer, the term of this patent is extended or adjusted under 35 U.S.C. 154(b) by 537 days.

(21) Appl. No.: 15/960,052

(22) Filed: Apr. 23, 2018

(65) Prior Publication Data

US 2018/0303217 A1    Oct. 25, 2018

Related U.S. Application Data

(60) Provisional application No. 62/489,147, filed on Apr. 24, 2017.

(51) Int. Cl.
| | | |
|---|---|---|
| *A45D 1/00* | (2006.01) | |
| *A45D 2/00* | (2006.01) | |
| *A45D 2/36* | (2006.01) | |
| *A45D 2/40* | (2006.01) | |
| *H04W 4/80* | (2018.01) | |
| *H04R 1/02* | (2006.01) | |
| *A45D 6/20* | (2006.01) | |
| *A45D 1/28* | (2006.01) | |
| *A45D 1/04* | (2006.01) | |
| *A45D 7/02* | (2006.01) | |

(52) U.S. Cl.
CPC ............... *A45D 2/001* (2013.01); *A45D 1/04* (2013.01); *A45D 1/28* (2013.01); *A45D 2/367* (2013.01); *A45D 2/40* (2013.01); *A45D 6/20* (2013.01); *H04R 1/028* (2013.01); *H04W 4/80* (2018.02); *A45D 7/02* (2013.01); *A45D 2002/003* (2013.01); *H04R 2420/07* (2013.01)

(58) Field of Classification Search
CPC ... A45D 1/00; A45D 1/04; A45D 1/06; A45D 1/08; A45D 1/16; A45D 1/28; A45D 2001/002; A45D 2001/045; A45D 2/001; A45D 2/367; A45D 2/40
See application file for complete search history.

(56) References Cited

U.S. PATENT DOCUMENTS

| | | | | |
|---|---|---|---|---|
| 3,157,184 | A * | 11/1964 | Lee ........................... | A45D 1/04 132/232 |
| 2012/0055502 | A1* | 3/2012 | Wright ................... | A45D 2/001 132/226 |
| 2017/0055670 | A1* | 3/2017 | Carrier ................... | H04R 1/028 |
| 2018/0270410 | A1* | 9/2018 | Lyle ..................... | H04N 5/2252 |

* cited by examiner

*Primary Examiner* — Rachel R Steitz
(74) *Attorney, Agent, or Firm* — Clark Hill PLC; James R. Foley

(57) ABSTRACT

A hair styling iron with a built-in Bluetooth for using functionalities of the built-in Bluetooth while using the hair styling iron at high temperature is disclosed. The disclosed hair styling iron includes a circuit board with a built-in Bluetooth, a speaker, control button(s) and a rechargeable battery. Once the hair styling iron is paired with another Bluetooth device, the user can control certain function(s) of the connected Bluetooth device and also stream audio media from the connected Bluetooth device. The rechargeable battery provides power to the speaker and the circuit board when the hair styling iron is not connected to an alternative current (AC) power source.

12 Claims, 4 Drawing Sheets

HAIR STYLING IRON WITH A BUILT-IN BLUETOOTH

CROSS-REFERENCE TO RELATED PATENT APPLICATIONS

Embodiments of the present invention relate to U.S. Provisional Application Ser. No. 62/489,147, filed Apr. 24, 2017, entitled "HAIR STYLING IRON WITH A BUILT-IN BLUETOOTH", the contents of which are incorporated by reference herein in its entirety and which is a basis for a claim of priority.

FIELD OF THE DISCLOSURE

This disclosure generally relates to a hair styling iron. More particularly, the disclosure relates to a hair styling iron with a built-in Bluetooth for using functionalities of the built-in Bluetooth while using the hair styling iron at high temperature.

BACKGROUND OF THE DISCLOSURE

Straight or curly hair is remarkably quick and easy to get using a hair styling tool in the comfort of a user's home. For examples, ceramic flat irons are generally regarded as the best material that does the least amount of damage to user's hair. By using the proper straightening technique and applying the appropriate hair treatments before and after straightening, users can keep their hair straight all day and protect their hair from heat damage.

The process of straightening or curling the hair can be lengthy and tedious especially for people with long hair, and often takes place in a bathroom. So, most people like to find something else to do while ironing their hair such as listening to music, watching video and talking on the phone etc. However, this often requires users to use a plurality of electronic devices in the bathroom at a same time, such as a mobile device and/or a speaker for streaming music, using camera and calling/receiving phone calls. Using multiple electronic device may create clutter due to use of a plurality of AC adapters. Since most AC adapters will be plugged near the sink area, this also poses risk of electrocution to users. Users may also accidentally drop their mobile devices into the toilet and sink water while using their mobile devices in the bathroom.

Accordingly, there exists a need for an improved hair styling iron that allows users to entertain themselves while ironing their hair, such as streaming music, taking selfies and talking on the phone.

SUMMARY OF THE DISCLOSURE

Objectives of the present disclosure are to provide a hair styling iron with a built-in Bluetooth, where a user is able to connect the hair styling iron with another Bluetooth device such as a mobile phone to stream music via the hair styling iron's speaker, to control the mobile device via the hair styling iron's button(s) and to accept and hold phone calls.

In accordance with one embodiment of the present disclosure, a hair styling iron with built-in Bluetooth is disclosed comprising: 1) at least one heat plate, which generates heat when powered and provides ironing for a user's hair; 2) a circuit board with Bluetooth, which provides Bluetooth connection between the circuit board and a Bluetooth device (e.g., tablet such as iPad®, Surface Pro®, laptop, Kindle® or mobile phone such as iPhone® and Android); 3) a speaker in connection with the circuit board; 4) at least one control button in connection with the circuit board, wherein when the circuit board is connected to a Bluetooth device, the at least one control button is configured to control at least one function of the Bluetooth device or to adjust the speaker's volume; 5) a rechargeable battery which provides power at least to the circuit board and the speaker; and 6) a housing that holds the at least one heat plate, the circuit board, the speaker, the at least one control button and the rechargeable battery.

The disclosed hair styling iron provides users with various advantages over the conventional hair styling irons. For examples, users will no longer need to have multiple devices on their counter space, instead, they will have one single device that can do the job of multiple devices. The hair styling iron will have a Bluetooth capability to pair up with any mobile device, tablet. Users will no longer have to fumble for their phones, lose their phones, drop their phones or drown their phones in the toilet/sink water. Users can also answer their phone while flat ironing their hair, curling their hair or crimping their hair. Further, users will no longer have to deal with holding large bulky phones or tablets in order to take pictures in the bathroom, (statistically, 96% of selfies are taken in the bathroom due to lighting). So instead of users trying to hold the phone, maneuver the phone in the right angel, strike a pose and take a picture, users can now place the phone and shutter the camera all from one simple button placed on the disclosed hair styling iron. The Bluetooth on the disclosed hair styling iron also allows users to stream music so users no longer have to have a separate speaker playing. The user can simply pair up his or her mobile phone or tablet to the flat iron and begin streaming live music or audiobooks.

The foregoing and other objects, features and advantages of the present invention are more readily apparent from the detailed description of the preferred embodiments set forth below, taken in conjunction with the accompanying drawings.

DETAILED DESCRIPTION OF THE PREFERRED EMBODIMENT(S) AND DISCLOSURE

The following description is not to be taken in a limiting sense, but is made merely for the purpose of illustrating the general principles of the invention, since the scope of the invention is best defined by the following claims. Various inventive features are described below that can each be used independently of one another or in combination with other features.

For purpose of present disclosure, the term "hair styling iron" includes all types of hair styling tools such as flat iron, hair straightener and curling iron, all of which should be construed as part of the present disclosure. While the disclosed drawings and embodiments primarily use flat irons for demonstration, it shall not mean that the present disclosure is limited to flat irons.

Figure 1:
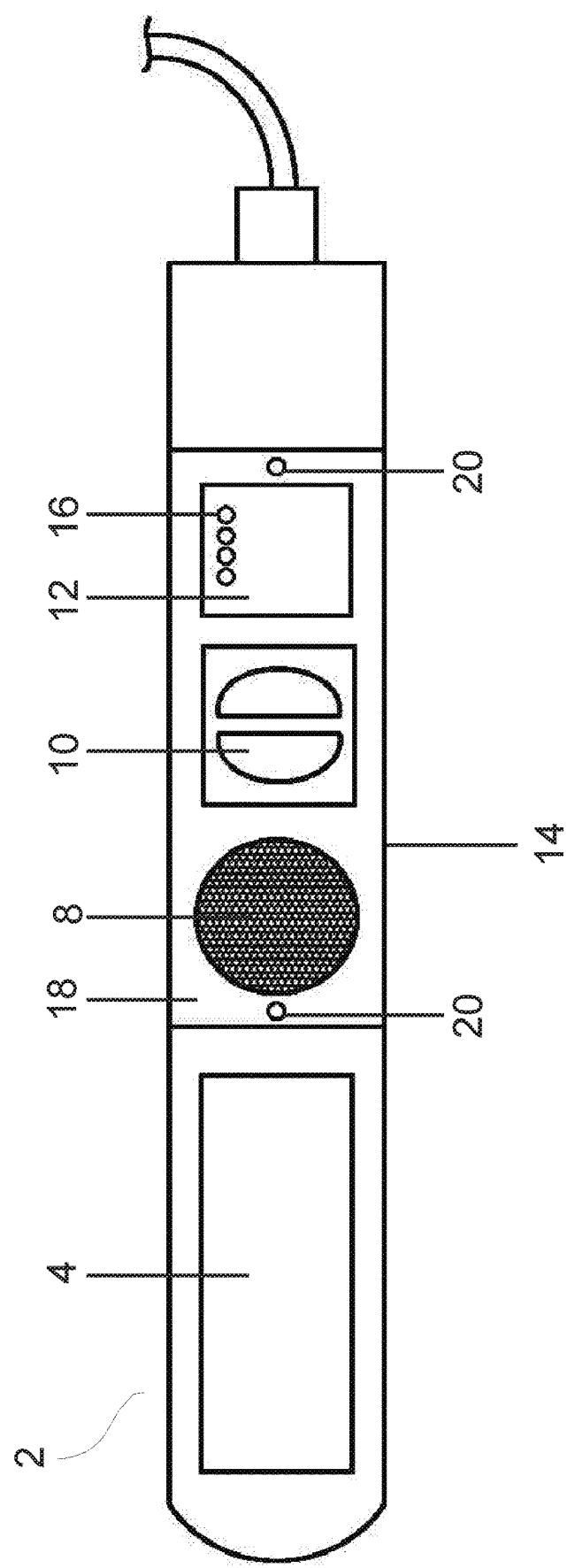
FIG. 1 is a schematic drawing according to an exemplary embodiment of the present invention.

Broadly, embodiments of the present disclosure generally provide a hair styling iron with a built-in Bluetooth for using functionalities of the built-in Bluetooth while using the hair styling iron at a high temperature. In accordance with one embodiment of the present disclosure, as shown by FIG. 1, a hair styling iron 2 with built-in Bluetooth is disclosed comprising: at least one heat plate 4, which generates heat when powered and provides ironing for a user's hair; a circuit board 6 with Bluetooth (shown in FIG. 2 but hidden in FIG. 1), which provides Bluetooth connection between the circuit board 6 and a Bluetooth device (e.g., a mobile phone or tablet); a speaker 8 in connection with the circuit board 6; at least one control button 10 also in connection with the circuit board 6, wherein when the circuit board 6 is connected to a Bluetooth device, the at least one control button 10 is configured to control at least one function of the Bluetooth device (e.g., answer/hold phone calls and/or shutter for camera etc.) or to adjust the speaker's 8 volume (e.g., during audio media stream); a rechargeable battery 12; and a housing 14 that holds the at least one heat plate 4, the circuit board 6, the speaker 8, the at least one control button 10 and the rechargeable battery 12.

The rechargeable battery 12 is configured to provide power to the circuit board 6 and the speaker 8 while the hair styling iron 2 is not connected to an AC power source. So that a user can still use the disclosed Bluetooth features even whey the user is not ironing his or her hair. However, it can also be configured to provide power to the heat plate 4 if the hair styling iron 2 is designed to be a cordless model. The rechargeable battery 12 may optionally include a battery capacity indicator 16 displaying amount of power left in the rechargeable battery 12. Once the hair styling iron 2 is connected to a power source such as AC power, typically 110-120V and/or 220-240V, the rechargeable battery will be recharged.

The at least one control button 10 may additionally be configured to be a multifunction button so that it serves as the power button for enabling the Bluetooth of the circuit board 6, the power button for turning the heat plate 4 and/or the temperature control button for adjusting the temperature of the at least one heat plate 4 (typically ranging from 170 to 450 degrees Fahrenheit). For instances, at least one control button 10 can be configured in a way that one click represents turning on Bluetooth and double clicks represents turning on the heat plate 4 etc.

Figure 3:
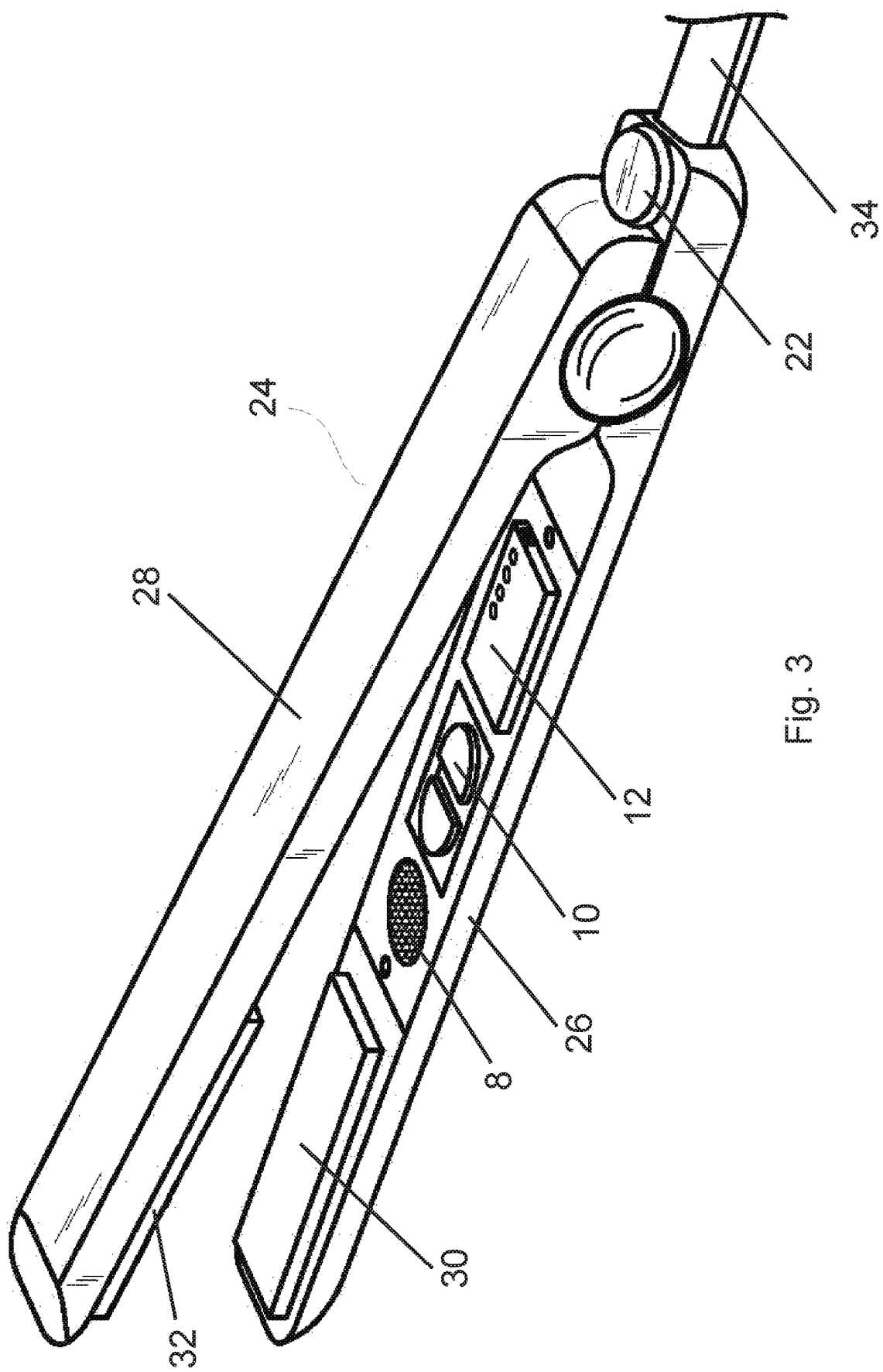
FIG. 3 is a schematic drawing according to an exemplary embodiment of the present invention.
Figure 4:
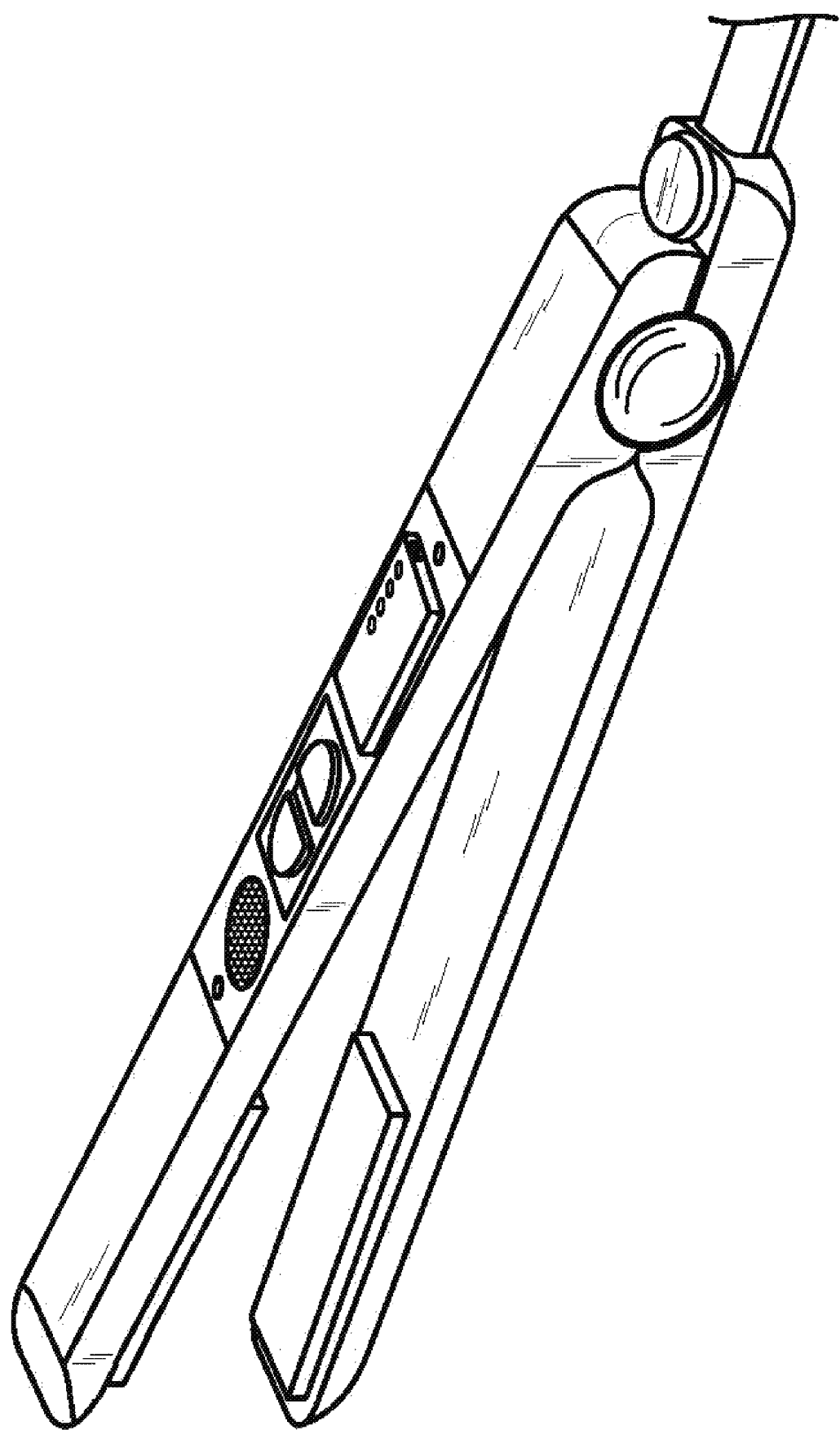
FIG. 4 is a schematic drawing according to an exemplary embodiment of the present invention.

Alternatively, instead of using the at least one at least one control button 10 to power up the at least one heat plate 4 and to adjust the at least one heat plate 4's temperature, the disclosed hair styling iron 2 may include additional power button and/or temperature adjustment button. As shown by FIGS. 3 and 4, an additional knob-style controller 22 can be implemented to turn ON and OFF the at least one heat plate and adjust the temperature of the at least one heat plate. For example, and not by way of limitation, it may provide temperature adjustment between 70 to 450 degrees Fahrenheit depending on the degree the knob-style controller 22 is being turned. The power button and the temperature adjust button may also be designed to be separated buttons depending on the designer's preference.

Figure 2:
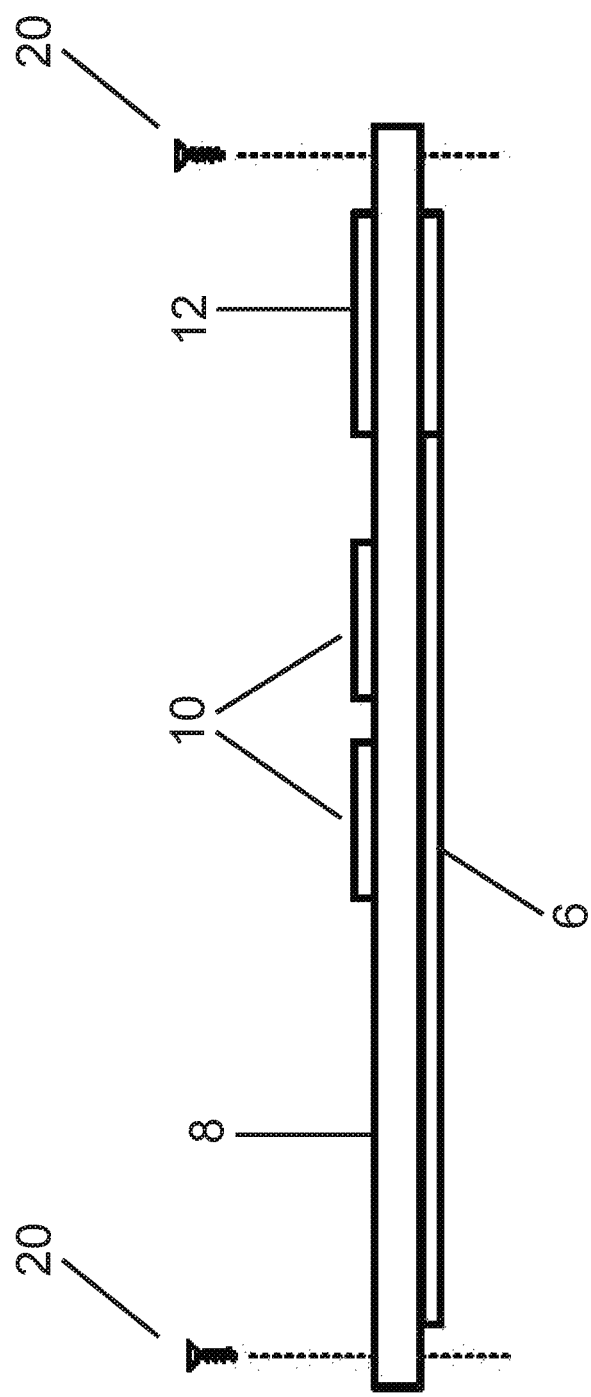
FIG. 2 is a schematic drawing according to an exemplary embodiment of the present invention.

For convenience of assembly, the speaker 8, the at least one control button 10 and the rechargeable battery 12 can be aligned and placed within a chamber 18 (e.g., rectangular chamber) along with the circuit board 6 as shown by FIG. 2. Then the chamber 18 can be secured to the housing 14 through any means of attachment such as screws 20 and/or clips. The hair styling iron 2 may further comprises a cable for receiving electric power from an AC electric power source (110-120V and/or 220-240V) and delivers the electric power to the at least one heating plate and the rechargeable battery when the hair styling iron 2 is plugged into an outlet.

When the hair styling iron 2 is connected to a Bluetooth device, such as a mobile phone or tablet, it can stream media like audio from the Bluetooth device so a user can listen to music or audio book while ironing his or her hair. Also, when the hair styling iron 2 is connected to a Bluetooth device with camera, the at least one control button 10 is configured to serves as a shutter for the camera. This allows the users to take selfies while ironing their hair.

In yet another embodiment of the present disclosure, the disclosed hair styling iron 2 may alternatively include a microphone (not shown in the Figs), which is also in connection with the circuit board 6 and is capable of receiving and sending sound (e.g., a user's voice) to the connected Bluetooth device. This allows the users to talk with others on the phone while ironing their hair styling iron when the hair styling iron 2 (or the circuit board 6) is connected to a mobile phone.

In yet another embodiment, the circuit board 6 measures 49×22 mm and holds over 60 components in order to access the mobile device for streaming audio media, for using a camera, for calling and receiving a phone call. The speaker is of 3 Watt with 4 Ohm electrical resistance. The rechargeable battery is of lithium 3.7 V 120 mAh, which is capable of providing up to 10 hours of use of the built-in Bluetooth functionalities. For hair styling iron with cord (shown in FIG. 3 as 34), the swivel power cord is 2.7 m. Further, the built-in Bluetooth includes Advanced Audio Distribution Profile (A2DP), Audio Video Remote Control Profile (AVRCP), Hands-Free Profile (HFP), Headset Profile (HSP).

FIGS. 3 and 4 demonstrate a hair styling iron 24 with different design according to another embodiment of the present disclosure. In this embodiment, the disclosed hair styling iron 24 comprises: a first arm 26 pivotally connected to a second arm 28, wherein each arm has a respective housing, a handle portion, and a heat plate (30 and 32 respectively), wherein the heat plate generates heat when powered and provides ironing for a user's hair; a circuit board 6 with Bluetooth as shown by FIG. 2, located within the first arm's 26 housing and provides Bluetooth connection between the circuit board 6 and a Bluetooth device; a speaker 8, located within the first arm's 26 housing and in connection with the circuit board 6, which plays sound streamed from the Bluetooth device when the circuit board is connected to the Bluetooth device; at least one control button 10, located within the first arm's 26 housing and in connection with the circuit board 6, wherein when the circuit board 6 is connected to the Bluetooth device, the at least one control button 10 is configured to control at least one function of the Bluetooth device or to adjust the speaker's 8 volume; and a rechargeable battery 12, located within the first arm's 26 housing or the second arm's 28 housing and provides power to at least the circuit board 6 and the speaker 8 (may also provide power to the heat plate 4 if the hair styling iron 24 is designed to be cordless). Like the hair styling iron in FIG. 1, the hair styling iron 24 may further include a microphone (not shown in the Figs.) so that users can talk with others on the phone while ironing their hair.

Similarly, the at least one control button 10 may additionally be configured to be a multifunction button so that it serves as the power button for enabling the Bluetooth of the circuit board 6, the power button for turning the heat plate 4 and/or the temperature control button for adjusting the temperature of the at least one heat plate 4 (e.g., ranging from 70 to 450 degrees Fahrenheit). Alternatively, the hair styling iron 24 may further comprise a power and/or temperature adjustment button 22 that provides temperature adjustment for the first arm's heat plate 30 and the second arm's heat plate 32. For example, a knob-style controller 22 can be implemented to turn ON and OFF the heat plates (30, 32) and adjust the temperature of the heat plates (30, 32).

In FIG. 3, The speaker 8, the at least one control button 10 and the rechargeable battery 12 are aligned and located within the first arm's 26 inner surface and adjacent to the first arm's heat plate 30. The speaker 8, the at least one control button 10 and the rechargeable battery 12 can also be located on the outer surface of the first arm 26 or the second arm 28 as shown by FIG. 4. They can also be located separately depending on the designer's choice (e.g., rechargeable battery on one arm, speaker and control button on another arm etc.).

Based on the foregoing, the hair styling iron of the present disclosure provides at least the following features: 1) it pairs with majority of Bluetooth devices such as mobile phones and tablets (E.g., iPad, Surface Pro, laptop, Kindle); 2) it can be used as a shutter for the Camera from the tablet and mobile cell phones; 3) it can accept and hold phone call conversations through while operating from 70-450 degrees Fahrenheit; 4) It can live stream off of music, book and educational apps from mobile cell phone and tablets while, smoothing hair, curling hair, waving hair, crimping hair, and straightening hair; and 5) it has a controllable temperature ranging at least from 70 to 450 degrees.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A hair styling iron comprising: at least one heat plate, which generates heat when powered and provides ironing for a user's hair; a circuit board configured to provide that the hair styling iron connects to and communicates with an external device using radio waves; a speaker in connection with the circuit board; at least one control button in connection with the circuit board; a rechargeable battery which provides power to the circuit board and the speaker; and a housing that holds the at least one heat plate, the circuit board, the speaker, the at least one control button and the rechargeable battery, wherein the circuit board is configured to provide that when the hair styling iron is connected to the external device, the at least one control button is operable to control at least one function of the external device, wherein the circuit board is configured such that, when the external device comprises a camera, the at least one control button is operable to control the shutter for the camera, wherein the hair styling iron is configured to be used to operate the camera of the external device to take a picture.

2. The hair styling iron according to claim 1, wherein the external device is a mobile phone or a tablet.

3. The hair styling iron according to claim 1, wherein the speaker plays sound streamed from the external device when the hair styling iron is connected to the external device.

4. The hair styling iron according to claim 1, further comprising a microphone, wherein, when the external device is a mobile phone, the microphone and the speaker provide the user with an ability to talk on the mobile phone via the hair styling iron.

5. The hair styling iron according to claim 1, wherein the circuit board is configured to provide that at least one control button is a single multipurpose button which is operable to selectively control both connectivity of the hair styling iron to the external device and power to the at least one heat plate.

6. The hair styling iron according to claim 1, further comprising a cable for receiving electric power from an alternating current (AC) source and delivering the electric power to the at least one heating plate and the rechargeable battery.

7. A hair styling iron comprising: a first arm pivotally connected to a second arm, wherein each arm has a respective housing, a handle portion, and a heat plate, wherein the heat plate generates heat when powered and provides ironing for a user's hair; a circuit board configured to provide that the hair styling iron connects to and communicates with an external device using radio waves, said circuit board located within the first arm's housing; a speaker, located within the first arm's housing and in connection with the circuit board, which plays sound streamed from the external device when the board hair styling iron is connected to the external device; at least one control button, located within the first arm's housing and in connection with the circuit board and a rechargeable battery, located within the first arm's housing or the second arm's housing and provides power to the circuit board and the speaker, wherein the circuit board is configured to provide that the at least one control button is operable to control at least one function of the external device, wherein the circuit board is configured such that, when the external device comprises a camera, the at least one control button is operable to control the shutter for the camera, wherein the hair styling iron is configured to be used to operate the camera of the external device to take a picture.

8. The hair styling iron according to claim 7, further comprising a microphone, wherein, when the external device is a mobile phone, the microphone and the speaker provide the user with an ability to talk on the mobile phone via the hair styling iron.

9. A hair styling iron comprising: a first arm pivotally connected to a second arm, wherein each arm has a respective housing, a handle portion, and a heat plate, wherein the heat plate generates heat when powered and provides ironing for a user's hair; a circuit board configured to provide that the hair styling iron connects to and communicates with an external device using radio waves, said circuit board located within the first arm's housing; a speaker, located within the first arm's housing and is in connection with the circuit board, wherein the speaker plays sound streamed from the external device when the hair styling iron is connected to the external device; at least one control button, located within the first arm's housing and is in connection with the circuit board; a rechargeable battery, located within the first arm's housing or the second arm's housing and provides power to the circuit board and the speaker; and a temperature adjustment button, located within the first arm's housing or the second arm's housing and provides temperature adjustment for the first arm's heat plate and the second arm's heat plate, wherein the circuit board is configured to provide that the at least one control button is operable to control at least one function of the external device, wherein the circuit board is configured such that, when the external device comprises a camera, the at least one control button is operable to control the shutter for the camera, wherein the hair styling iron is configured to be used to operate the camera of the external device to take a picture.

10. The hair styling iron according to claim 9, further comprising a microphone that is in connection with the circuit board, wherein the microphone receives sound and transmits the sound to the external device when the hair styling iron is connected to the external device.

11. The hair styling iron according to claim 7, wherein the circuit board is configured to provide that at least one control button is a single multipurpose button which is operable to selectively control both connectivity of the hair styling iron to the external device and power to the at least one heat plate.

12. The hair styling iron according to claim 9, wherein the circuit board is configured to provide that at least one control button is a single multipurpose button which is operable to selectively control both connectivity of the hair styling iron to the external device and power to the at least one heat plate.

* * * * *